2,886,570

3-ARYL-3-(4-PIPERIDYL) PROPANOLS

Frank P. Palopoli, Geraldine L. Krueger, and Charles H. Tilford, Cincinnati, Ohio, assignors to The Wm. S. Merrell Company No Drawing. Application February 28, 1958
Serial No. 718,142

2 Claims. (Cl. 260—294.7)

Our invention relates to certain novel 3-aryl-3-(4-piperidyl)-propanols useful as diuretics.

The novel compounds of our invention are useful in the treatment and prevention of edematous conditions of various etiologies in patients, including, for example, cardiac decompensation, hypertensive cardiovascular disease, diabetic nephropathy, nephrosis, glomerulonephritis, liver cirrhosis, toxemia of pregnancy and venous stasis. The compounds have no significant cardiovascular or central nervous system effects.

The new compounds are useful orally and parenterally for the above purposes. Orally, they are useful in dosages of about 100 to 2,000 mg. daily and parenterally in doses of about 20 to 400 mg. daily.

The new compounds are certain 3-aryl-3-(4-piperidyl) propanols and can be represented by the following formula:

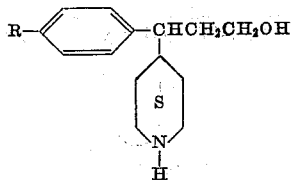

wherein S indicates that the ring is saturated and wherein R is hydrogen, methyl, methoxy or chlorine. The compounds are characterized by the primary alcohol group and the secondary amine group. The presence of substituents, e.g., alkyl, on the nitrogen atom changes the properties of the compounds. For example, the N-methyl derivative of the compounds where R is hydrogen does not have diuretic activity.

The new compounds can be prepared and used as the free base and also can be isolated and used in the form of their salts such as the hydrochloric, citric, maleic, tartaric and other pharmaceutically acceptable acid addition salts. The compounds contain an asymmetric carbon atom (the carbon atom bearing the piperidine and aryl groups) and can exist as the racemic mixture and also as optically active isomers. Our invention includes the compounds in the above forms.

The new compounds can be prepared by the hydrogenation of the corresponding pyridine compounds:

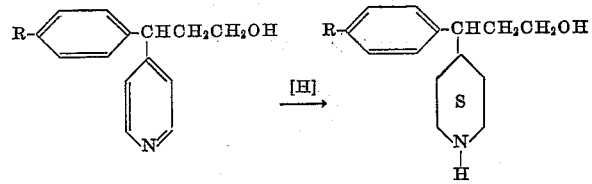

The hydrogenation is preferably carried out with hydrogenation catalysts such as platinum oxide, palladium on charcoal and other similar catalysts capable of use in the hydrogenation of pyridine derivatives to piperidine derivatives. Other methods of hydrogenating the pyridine ring such as, for example, the reduction with sodium and alcohol can also be used.

The pyridine starting materials can be prepared by reaction of the corresponding 4-benzyl pyridines with ethylene oxide:

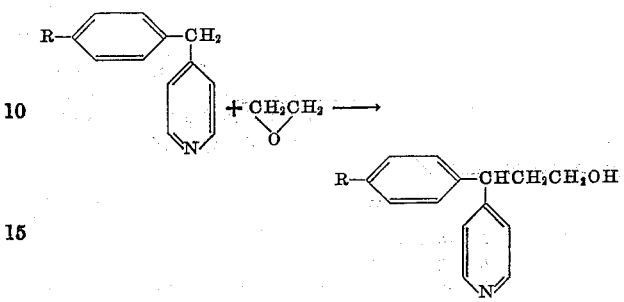

The 4-benzylpyridines can be prepared by reaction of isonicotinic acid with an aldehyde followed by reaction with sulfuryl chloride and zinc and acetic acid:

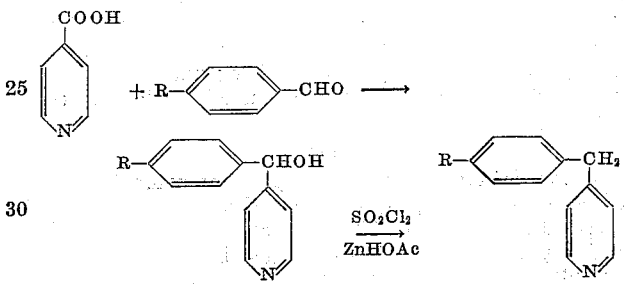

The new compounds of our invention will be further illustrated by reference to the following examples.

Example 1

*3-phenyl-3-(4-piperidyl)propanol.*—To a solution of 21.3 g. (0.1 mole) of 3-phenyl-3-(4-pyridyl)propanol in 200 ml. of ethanol was added 9.0 ml. (0.1 mole) of concentrated hydrochloric acid. The solution was added to a suspension of 0.5 g. of platinum oxide in 25 ml. of ethanol and hydrogenated at low pressure, utilizing the Parr apparatus. After hydrogenation was complete, the catalyst was removed and the volume of the solution reduced to one-third. On dilution with ethyl acetate a colorless solid separated, melting at 193–195° C. Recrystallization from an alcohol-ethyl acetate mixture gave 19 g. (75%) of the desired 3-phenyl-3-(4-piperidyl)propanol hydrochloride, melting at 195–196° C.

*Analysis.*—Calcd. for $C_{14}H_{21}NO \cdot HCl$: C, 65.73; H, 8.67; N, 5.48. Found: C, 65.87; H, 8.07; N, 5.47.

The base was made by dissolving the above salt in water and making the solution alkaline with sodium hydroxide. The base precipitated and was filtered and washed with water. Recrystallization from benzene gave, dl-3-phenyl-3-(4-piperidyl)propanol, melting at 106–108° C.

This compound exhibited diuretic activity and no significant cardiovascular effects or central nervous system effects.

Eight and eight tenths grams (0.04 mole) of dl-3-phenyl-3-(4-piperidyl)propanol, in 80 ml. of butanol/alcohol 10:1, was added to 6.0 g. (0.04 mole) of D-tartaric acid dissolved in 80 ml. of butanone/alcohol 1:1. On standing, a solid separated and there was obtained 11.2 g. of material, melting at 238–240° C. One recrystallization brought the melting point to 250–252° C. The 3-phenyl-3-(4-piperidyl)propanol D-tartrate so obtained had $[\alpha]_D^{25} = +8.5°$ in a 2 percent solution in water. This D-tartrate salt was converted to its base which had a rotation of $[\alpha]_D^{25} = -4.5°$ in a 2 percent solution in methanol, M.P. 94–96° C.

Example 2

3-(p-chlorophenyl)-3-(4-piperidyl)propanol.—By the procedure given in Example 1 and using 24.7 g. (0.1 mole) of 3-(p-chlorophenyl)-3-(4-pyridyl)propanol, the desired 3-(p-chlorophenyl)-3-(4-piperidyl)propanol hydrochloride was obtained.

Example 3

3-(p-tolyl)-3-(4-piperidyl)propanol.—By the procedure given in Example 1 and using 22.6 g. (0.1 mole) of 3-(p-tolyl)-3-(4-pyridyl)propanol, the desired 3-(p-tolyl)-3-(4-piperidyl)propanol hydrochloride was obtained as hydroscopic material.

Example 4

3-(p-methoxyphenyl)-3-(4-piperidyl)propanol.—By the procedure given in Example 1 and using 24.2 g. (0.1 mole) of 3-(p-methoxyphenyl)-3-(4-pyridyl)propanol, the desired 3-(p-methoxyphenyl)-3-(4-piperidyl)propanol hydrochloride was obtained as a white solid.

The following examples illustrate suitable pharmaceutical compositions including a pharmaceutical carrier and the novel compounds. In these examples, the quantities are given for single units, it being understood that in actual practice, the dosage forms will be prepared in suitable quantities, and the amounts of materials adjusted accordingly.

Example 5

25 mg. tablets.—Twenty-five mg. of the hydrochloride of 3-phenyl-3-(4-piperidyl)propanol (Example 1), 48 mg. of powdered sugar, and 32 mg. of corn starch are mixed and granulated with 10 percent gelatin solution. The granulation is dried and ground to fine granules for tableting. About 1 percent magnesium stearate is added as a lubricant, together with sufficient corn starch to give a weight of 2.5 grains per tablet. The product is compressed on a single punch or rotary machine using a 9/32 inch punch.

Example 6

500 mg. tablets.—Five hundred mg. of the hydrochloride of 3-phenyl-3-(4-piperidyl)propanol (Example 1) in finely powdered form is admixed with 60 mg. of corn starch and 100 mg. of powdered sugar and then granulated with 10 percent gelatin solution. The granulation is dried and ground to size suitable for tableting. About 1 percent magnesium stearate is added as a lubricant, together with sufficient corn starch to give a weight of 700 mg. per tablet. The product is compressed on a single punch or rotary machine using a 7/16 inch punch.

The tablets of Examples 5 and 6 may be suitably coated if desired, as, for example, with sugar.

Example 7

25 mg. capsule.—Twenty-five mg. of the hydrochloride of 3-phenyl-3-(4-piperidyl)propanol (Example 1) is admixed with corn starch in quantity required to provide sufficient bulk for the desired size capsule, and the mixture is encapsulated.

Example 8

500 mg. capsule.—Five hundred mg. of the hydrochloride of 3-phenyl-3-(4-piperidyl)propanol (Example 1) is admixed with sufficient corn starch to give the proper bulk for the desired capsule, and the mixture is encapsulated.

Example 9

Injectable suspension, 100 mg. per ml.—The following ingredients are sterilized separately: 100 mg. of the hydrochloride of 3-phenyl-3-(4-piperidyl)propanol (Example 1), 0.1 mg. of Tween 80 and q.s. corn oil to make a final volume of one ml. These ingredients are admixed aseptically. Particle size may be achieved by use of micronized material or by use of a ball mill, maintaining aseptic conditions. The above suspension may be administered subcustaneously and intramuscularly.

Example 10

Oral suspension, 700 mg. per 15 ml.—One hundred fifty mg. of Veegum H. V. are hydrated in about 9 ml. of water; 500 mg. of Tween 80, 700 mg. of the hydrochloride of 3-phenyl-3(4-piperidyl)propanol (Example 1), color and flavor, as desired, and water q.s. 15 ml. are added; the product is mixed well and homogenized.

Example 11

Liquid (syrup), 25 mg. per teaspoon.—Twenty-five mg. of the hydrochloride of 3-phenyl-3-(4-piperidyl)propanol (Example 1) is dissolved in one ml. of water. Five mg. of sodium benzoate, 3.5 ml. of liquid sugar, 5 mg. of citric acid, and 0.375 mg. of butoben are added and stirred until dissolved, using gentle heat if necessary. Flavor, as desired, and water q.s. are then added.

Example 12

Liquid (syrup), 500 mg. per tablespoon.—Five hundred mg. of the hydrochloride of 3-phenyl-3-(4-piperidyl)propanol (Example 1) and 4.5 mg. of sugar are dissolved in sufficient water so that after the addition of 2.25 ml. of alcohol, USP, and flavor, as desired, the volume is 15 ml.

Example 13

Injectable solution, 100 mg. per ml.—One hundred mg. of the hydrochloride of 3-phenyl-3-(4-piperidyl)propanol (Example 1) and water for injection q.s. one ml. are mixed and warmed gently till solution is accomplished. The solution is filtered through fine sintered glass, filled into sterile one ml. ampuls, and sterilized at 250° F. for 30 minutes.

The compounds of Examples 2 to 4 can also be used in the preparations of Examples 5 to 13.

We claim:

1. The compounds of the formula

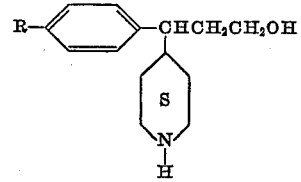

wherein S indicates the ring is saturated and R is selected from the group consisting of hydrogen, methyl, methoxy and chlorine.

2. 3-phenyl-3-(4-piperidyl)propanol.

No references cited.